United States Patent [19]

Negishi et al.

[11] Patent Number: 4,491,386

[45] Date of Patent: Jan. 1, 1985

[54] OPTICAL FIBER CABLE AND PROCESS FOR PRODUCTION THEREOF

[75] Inventors: Yukiyasu Negishi; Yukinori Ishida, both of Ibaraki; Yasunori Saito; Shigeru Tanaka, both of Kanagawa, all of Japan

[73] Assignees: Nippon Telegraph & Telephone Public Corporation, Tokyo; Sumitomo Electric Industries, Ltd., Osaka, both of Japan

[21] Appl. No.: 298,150

[22] Filed: Aug. 31, 1981

[30] Foreign Application Priority Data

Aug. 29, 1980 [JP]   Japan ............................ 55-118446

[51] Int. Cl.³ .............................................. G02B 5/14
[52] U.S. Cl. .................................................. 350/96.23
[58] Field of Search ............... 350/96.23; 57/7, 9, 57/295; 264/1.5; 219/60.2, 61

[56] References Cited

U.S. PATENT DOCUMENTS

| 3,955,878 | 5/1976 | Nowak | 350/96.23 |
| 4,227,770 | 10/1980 | Gunn | 350/96.23 |
| 4,257,675 | 3/1981 | Nakagome et al. | 350/96.23 |
| 4,341,440 | 7/1982 | Trezeguet et al. | 350/96.23 |
| 4,389,088 | 6/1983 | Trezequet | 350/96.23 |
| 4,408,828 | 10/1983 | Le Noane et al. | 350/96.23 |

FOREIGN PATENT DOCUMENTS

| 2468136 | 4/1981 | France | 350/96.23 |
| 0043610 | 4/1981 | Japan | 350/96.23 |
| 2017335 | 10/1979 | United Kingdom | 350/96.23 |
| 2021282 | 11/1979 | United Kingdom | |
| 2052092 | 1/1981 | United Kingdom | |
| 2064811 | 6/1981 | United Kingdom | |

*Primary Examiner*—John Lee
*Attorney, Agent, or Firm*—Sughrue, Mion, Zinn, Macpeak, and Seas

[57] ABSTRACT

An optical fiber cable is described comprising a linear center member having at least one longitudinal and spiral groove in the surface thereof, one coated optical fiber received in each groove, an outer sheath that encloses the center member, and a jelly-like material with which the space around each optical fiber is entirely filled. A process for producing such an optical fiber cable is also described.

12 Claims, 9 Drawing Figures

(a) (b) (c)

(a) (b)

OPTICAL FIBER CABLE AND PROCESS FOR PRODUCTION THEREOF

FIELD OF THE INVENTION

This invention relates to an optical fiber cable having watertightness and structural stability under high water pressure, and to a process for producing such a cable.

BACKGROUND OF THE INVENTION

Because of their light weight, small diameter, low transmission loss and large transmission capacity, optical fiber cables have potential use as marine cables under high water pressure conditions. A construction wherein a bundle of coated optical fibers is confined in a pressure container such as a metal tube to protect them from an external force has been proposed as an optical fiber cable adapted for use under high water pressure. However, an undersea cable that is laid down on a sea bed which may be several thousand meters deep must withstand a water pressure of several hundred kg/cm$^2$. To meet this requirement, the wall thickness of a pressure container such as a metal tube must be increased appreciably, but with the present level of manufacturing technology, the production of such pressure container is very difficult. To eliminate this problem, a cable of the construction shown in FIG. 1 has been proposed; the cable comprises an airtight tube 01 which has both a bundle of coated optical fibers 02 and fluid 03 so that the pressure inside the tube 01 is equal to the pressure outside the tube when the tube is placed under high pressure. However, when an external force is applied to this type of cable, the fibers 02 undergo microbending that increases transmission loss. In addition, the cable is not satisfactorily protected from external forces whereby problems such as breakage of fibers may occur.

SUMMARY OF THE INVENTION

Therefore, one object of this invention is to provide an optical fiber cable that is free from the defects of previously proposed cables and which has high watertightness and structural stability under high water pressure.

This object can be achieved by an optical fiber cable comprising a linear center member having at least one longitudinal and spiral groove in the surface thereof, one coated optical fiber positioned in the groove, an outer sheath that encloses the center member, and a jelly-like material filling the space around the optical fiber.

The optical fiber cable of the present invention can be produced by positioning one coated optical fiber in each of the grooves formed longitudinally and spirally in the surface of a linear center member, applying a jelly-like material onto the surface of the center member, and forming an outer sheath around the center member, the outer sheath having an inside diameter slightly larger than the outside diameter of the center member, and then reducing the diameter of the outer sheath until the inside surface of the outer sheath is in intimate contact with the outside surface of the center member.

DETAILED DESCRIPTION OF THE INVENTION

The term "coated optical fiber" used herein means a glass fiber for optical transmission having outer coatings of various materials for the purpose of mechanical protection, reinforcement and/or absorption of undesirable transmission mode. A typical example of such coated optical fibers is those having a primary coat of silicone and a secondary coat of nylon which are well known in the art.

According to the process of this invention using a linear center member having at least one longitudinally and spirally formed groove, a jelly-like material can be easily filled in the space around the optical fiber without leaving air in the groove.

Preferred embodiments of this invention are described hereunder by reference to the accompanying drawings, FIGS. 2 to 6.

Figure 2:
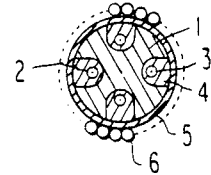
FIG. 2 is a cross section of an optical fiber cable according to one embodiment of this invention.

FIG. 2 shows a cross section of an optical fiber cable according to one embodiment of this invention. A linear center member 1 has a plurality of grooves 2 (four grooves in the illustrated embodiment) formed longitudinally and spirally in the surface, and a single coated optical fiber 3 is placed in each groove 2. The linear center member having at least one longitudinal and spiral groove can be easily produced, for example, by extrusion using a profile die or continuous extrusion using an appropriate extrusion apparatus such as "Conform" to prepare a linear center member having at least one straight groove in the surface thereof and twisting the resulting linear center member to provide a member having longitudinal and spiral groove(s). The space around the optical fiber 3 in the groove 2 is entirely filled with a jelly-like material, and the center member 1 is coated with an airtight thin-walled outer sheath 5 that is in intimate contact with the center member 1. The outer sheath 5 is further coated with an armor 6 that mechanically reinforces the cable. Since the center member 1 is required to have high resistance to tension and strength as well as ease of working into various shapes, it is advantageously made of a metal such as copper or aluminum, a non-metal such as rubbers (natural or synthetic) or other plastics, a composite material comprising fibrous materials such as carbon fibers, glass fibers, aromatic polyamide fibers hardened with a resin, or a combination thereof. The jelly-like material 4 is a substance that is fluid or semi-fluid at room temperature, and suitable examples are petroleum jelly, non-crosslinked silicone resin, and polybutene. The jelly-like material 4 works to fix the optical fibers 3 in the grooves 2 and provide a buffer to external forces. The outer sheath 5 is preferably made of a soft metal, such as copper or aluminum, or a plastic material such as polyethylene.

Figure 1:
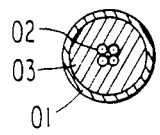
FIG. 1 is a cross section of the conventional pressure-resistant optical fiber cable.

In the optical fiber cable having the construction as described above, the linear center member 1 has adequate resistance to tension and has sufficient strength to protect the optical fibers 3, so strains such as elongation, bending and compression do not easily develop in the fibers 3 in the grooves 2. Furthermore, a single fiber 3 surrounded by the jelly-like material 4 is placed in the groove 2, so an external force is applied uniformly to the fibers 3 and there is no increase in transmission loss when the optical fiber cable is used under high water pressure. That is, in the cable construction where a plurality of coated optical fibers is placed in one groove, each of the coated fibers shows the movement of pressing against each other when an external force such as bending and stretching is applied to the optical fiber cable since the jelly-like material functions as a lubricating agent, whereby transmission loss of the optical fibers tends to increase due to the increased pressure against the side wall of fibers. Such phenomena have been demonstrated in various experiments. For example, in the optical fiber cable having a construction as shown in FIG. 1 where a plurality of optical fibers is placed in an aluminum tube in such a manner that the fibers are positioned loosely surrounded by a jelly-like material, it has been found that transmission loss increases due to the increased pressure against the fibers each other as described above. On the other hand, in the optical fiber cable having a construction as shown in FIG. 2 comprising an aluminum linear center member where a single coated optical fiber is placed in each groove and an aluminum outer sheath (e.g., 5 mm in diameter), no increase in transmission loss was found as determined by the same test method as used in the above optical fiber cable having the construction shown in FIG. 1.

Figure 3:
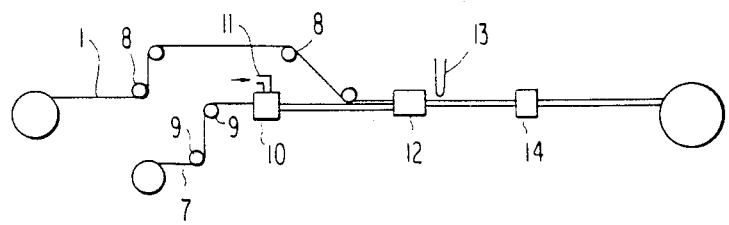
FIG. 3 is a schematic representation of a process for producing an optical fiber cable according to one embodiment of this invention.
Figure 4:
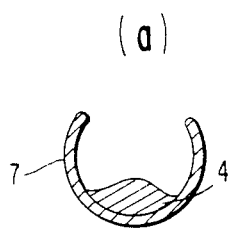
FIGS. 4(a), (b) and (c) are cross sections of an optical fiber cable at three stages of its production by the process shown in FIG. 3.
Figure 4:
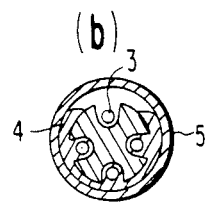
Figure 4:
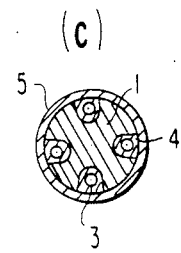

Two preferred embodiments of the process for producing the above-described optical fiber cable are illustrated below. FIG. 3 represents the method of production of an optical fiber cable wherein the outer sheath 5 is made of a metal tube. A linear center member 1 having grooves 2 formed longitudinally and spirally in the surface thereof with a coated optical fiber 3 being loosely fitted in the groove 2 is supplied to a metal tape welding apparatus, and in parallel to the member 1, a thin metal tape 7 made of copper, aluminum, etc., is supplied to the apparatus. In FIG. 3, the reference numerals 8 and 9 represent feed rollers. The metal tape 7 is directed to a first forming machine 10 where it is shaped into a generally cylindrical form, and at the same time, a jelly-like material 4 is injected to the bottom in the longitudinal direction (i.e., the inner surface of the lowest part of the side wall of the cylinder), as shown in FIG. 4(a), through an inlet port 11 of a filling machine for jelly-like material connected to the first forming machine 10. Then, the center member 1 is positioned within the generally cylindrical form of metal tape 7, which is sent to a secondary forming machine 12 where, as shown in FIG. 4(b), the side edges of the metal tape 7 are abutted against each other and welded. In FIG. 3, the numeral 13 indicates a welding electrode. In the first forming machine 10, the jelly-like material 4 is supplied to the bottom of the generally cylindrical form made of metal tape 7 in the longitudinal direction, and this is for the purpose of preventing the deposition of the jelly-like material 4 on the side edges of the tape 7 because such deposit makes the subsequent welding operation impossible.

As shown in FIG. 4(b), the inside diameter of the outer sheath 5 made of the welded metal tube is slightly larger than the outside diameter of the center member 1, forming a gap between the outer sheath 5 and the center member 1. By subsequently passing the outer sheath 5 through a conventional reducing apparatus 14 having a die, the diameter of the outer sheath 5 is reduced as shown in FIG. 4(c) to provide a cable wherein any space in the grooves 2 is filled with the jelly-like material 4 and there is no air left in the outer sheath 5.

Figure 5:
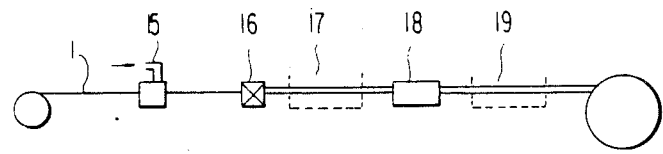
FIG. 5 is a schematic representation of a process for producing an optical fiber cable according to another embodiment of this invention.
Figure 6:
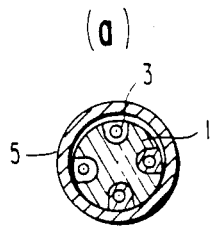
FIGS. 6(a) and 6(b) are cross sections of an optical fiber cable at two stages of its production by the process shown in FIG. 5.
Figure 6:
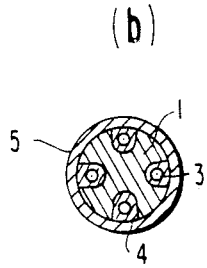

FIG. 5 represents the method of producing an optical fiber cable the outer sheath 5 of which is made of a plastic tube. A linear center member 1 having a coated optical fiber 3 loosely positioned in each of the grooves 2 is supplied to a cable making apparatus, and when it is passed through a jelly-like material filling apparatus 15, a jelly-like material 4 is deposited in the grooves 2 and on the surface of the center member 1. Subsequently, the center member 1 is fed to an extruder 16 where a plastic tube making an outer sheath 5 is extruded to cover the center member 1. The center member 1 is not heated before it enters the extruder 16, so when the center member 1 with the plastic outer sheath 5 is passed through a water tank 17 for cooling, the outer sheath 5 solidifies to provide a tube whose inside diameter is somewhat larger than the outside diameter of the center member 1 as shown in FIG. 6(a).

Subsequently, the center member 1 with the plastic tube 5 is heated in a heater 18 and cooled again in a water tank 19, and as a result of shrinkage due to the internal stress relaxation, intimate contact between the center member 1 and the plastic tube 5 is achieved as shown in FIG. 6(b), with the interior of the outer sheath 5 being free from air bubbles but being filled with the jelly-like material 4 throughout.

As discussed in the foregoing, in the optical fiber cable of this invention, a coated optical fiber is placed in each of the grooves formed in the surface of a center linear member longitudinally, the outer surface of the center member is intimately coated with an outer sheath, and the space around the optical fiber is entirely filled with a jelly-like material. Because of this construction, the cable achieves very good airtightness under high water pressure, and the high water pressure is applied uniformly to the optical fibers through the jelly-like material without developing any strain or increase in transmission loss. The process of this invention is capable of producing an optical fiber cable of the construction identified above without forming air bubbles in the jelly-like material.

While the invention has been described in detail and with reference to specific embodiments thereof, it will be apparent to one skilled in the art that various changes and modifications can be made therein without departing from the spirit and scope thereof.

What is claimed is:

1. An optical fiber cable comprising a linear center member having at least one longitudinal and spiral groove in the surface thereof, wherein said linear center member is formed from the group consisting of rubber, plastic, a composite material comprising fibrous material hardened with a resin and a combination thereof, one coated optical fiber positioned in said groove, an outer sheath that encloses the center member, and a jelly-like material filling the space around said optical fiber.

2. An optical fiber cable as in claim 1 wherein said jelly-like material is a substance that is fluid or semifluid at room temperature, and the outer sheath is a soft metal.

3. An optical fiber cable as in claim 2 wherein said jelly-like material is selected from the group consisting of petroleum jelly, non-crosslinked silicone resin, and polybutene, and said outer sheath is a soft metal selected from the group consisting of copper and aluminum.

4. An optical fiber cable as in claim 1, wherein said jelly-like material is a substance that is fluid or semifluid at room temperature, and the outer sheath is a plastic material.

5. An optical fiber cable as in claim 4, wherein said jelly-like material is selected from the group consisting of petroleum jelly, non-crosslinked silicone resin and polybbutene, and said outer sheath is polyethylene.

6. An optical fiber cable comprising a linear center member having at least one longitudinal and spiral groove in the surface thereof, an optical fiber coated with a cushioning material positioned in said groove, a thin outer sheath in intimate contact with the linear center member, and a jelly-like material filling the space around said optical fiber, wherein said outer sheath is made of a plastic material.

7. An optical fiber cable as in claim 6, wherein said plastic material is polyethylene.

8. An optical fiber cable comprising a linear center member having at least one longitudinal and spiral groove in the surface thereof, an optical fiber coated with a cushioning material positioned in said groove, a thin outer sheath in intimate contact with the linear center member, and a jelly-like material filling the space around said optical fiber, wherein said linear center member is made of copper or aluminum, said jelly-like material is a substance that is fluid or semifluid at room temperature, and the outer sheath is a plastic material.

9. An optical fiber cable as in claim 8, wherein said jelly-like material is selected from the group consisting of petroleum jelly, non-crosslinked silicone resin and polybutene, and said outer sheath is polyethylene.

10. A process for producing an optical fiber cable comprising positioning one coated optical fiber in at least one groove formed longitudinally and spirally in the surface of a linear center member, applying a jelly-like material onto the surface of the center member, and forming an outer sheath around the center member, said outer sheath having an inside diameter slightly larger than the outside diameter of said center member, and then reducing the diameter of said outer sheath until the inside surface of said outer sheath is in intimate contact with the outside surface of said center member.

11. A process for producing an optical fiber cable as in claim 10 having an outer sheath made of a metal tube, wherein the coated optical fiber is placed in grooves formed longitudinally and spirally in a linear center member and a generally cylindrically formed metal tape containing a jelly-like material injected to the bottom thereof and brought together such that the center member is positioned within the generally cylindrical form of the metal tape, the side edges of the metal tape are abutted against each other and welded, and then the resulting welded metal tube is passed through a reducing apparatus to reduce the diameter of the metal tube outer sheath.

12. A process for producing an optical fiber cable having an outer sheath made of a plastic tube, comprising positioning one coated optical fiber in at least one groove formed longitudinally and spirally in the surface of a linear center member, coating the linear center member with a jelly-like material, forming the outer sheath around the center member, the outer sheath having an inside diameter slightly larger than the outside diameter of the center member by feeding the center member into an extruder wherein a plastic tube is extruded to cover the center member, heating the resulting cable followed by cooling so as to reduce the diameter of the plastic sheath, and forming an intimate contact between the outside surface of the center member and the inside surface of the plastic tube outer sheath.

* * * * *